UNITED STATES PATENT OFFICE.

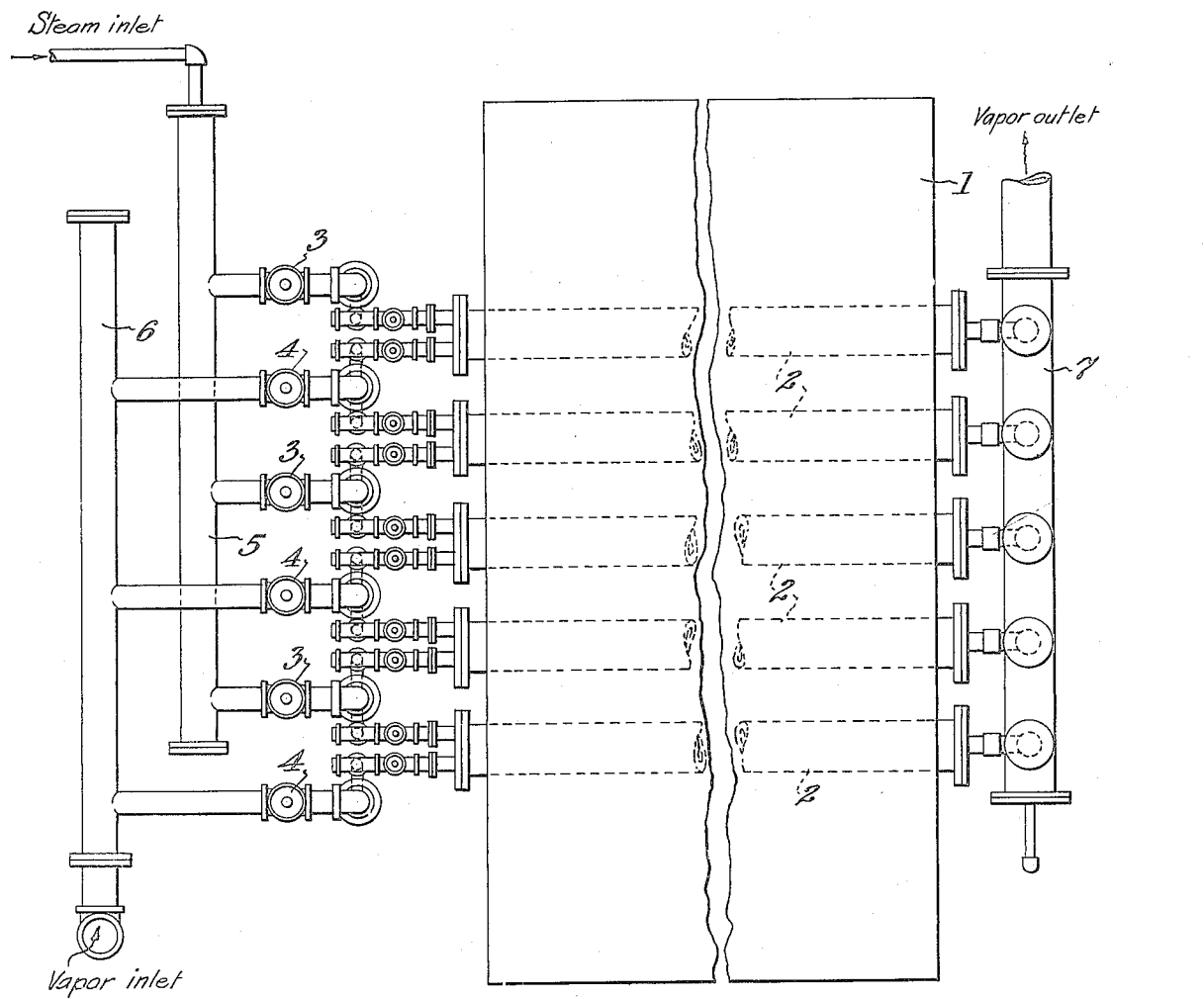

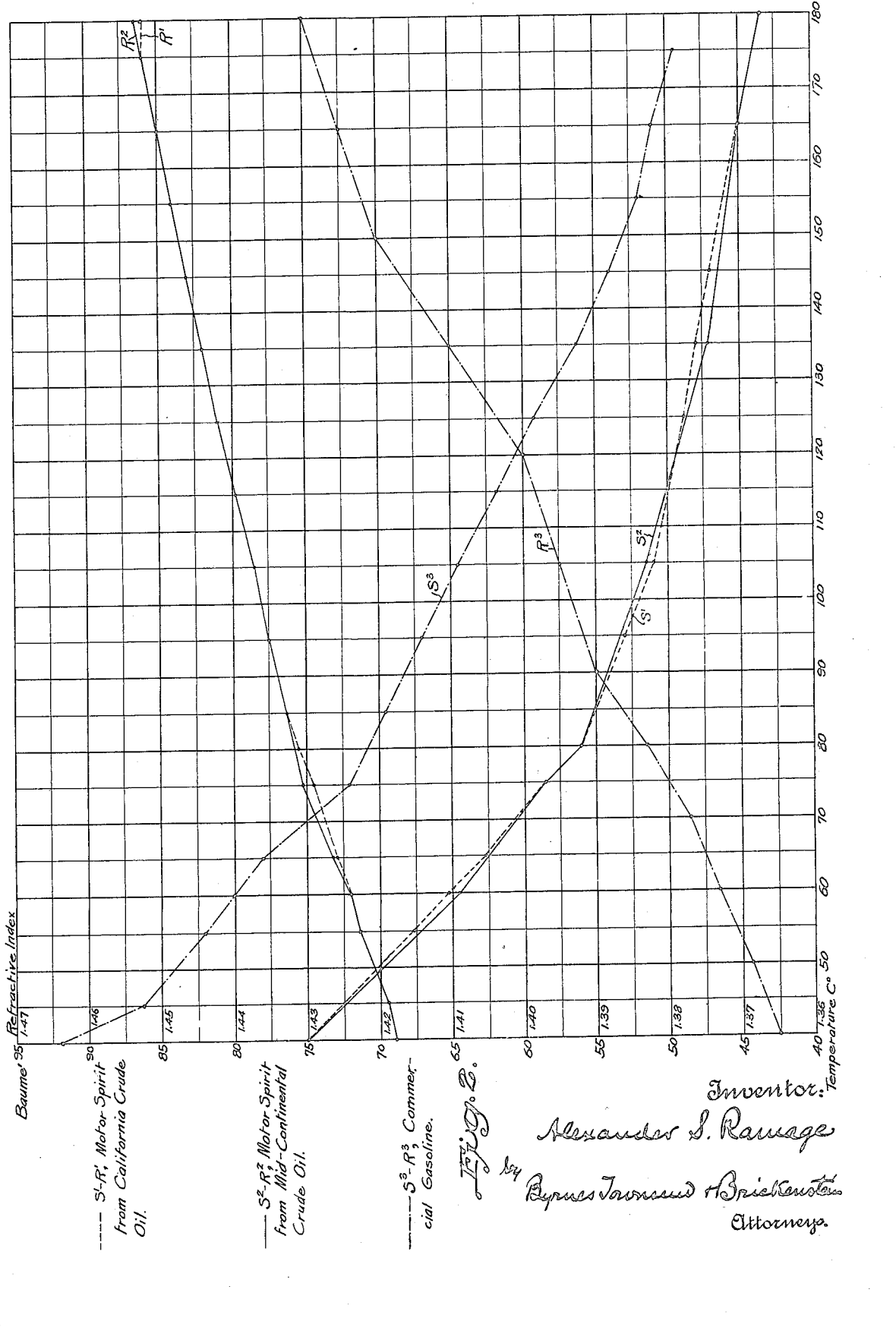

ALEXANDER S. RAMAGE, OF DETROIT, MICHIGAN, ASSIGNOR TO FRANK F. BEALL; SAID ALEXANDER S. RAMAGE AND BENJAMIN BRISCOE, ALL OF DETROIT, MICHIGAN, TRUSTEES, KNOWN AS CHEMICAL RESEARCH SYNDICATE, LTD.

PRODUCTION OF LOW-BOILING-POINT SATURATED HYDROCARBONS FROM HEAVY HYDROCARBON OILS.

1,403,194.     Specification of Letters Patent.     Patented Jan. 10, 1922.

Application filed January 28, 1921. Serial No. 440,743.

*To all whom it may concern:*

Be it known that I, ALEXANDER S. RAMAGE, a citizen of the United States, residing at Detroit, in the county of Wayne and State of Michigan, have invented certain new and useful Improvements in Production of Low-Boiling - Point Saturated Hydrocarbons from Heavy Hydrocarbon Oils, of which the following is a specification.

The object of this invention is to form low-boiling hydrocarbons, chiefly of a saturated nature, suitable for use as fuel in internal combustion engines, from heavier hydrocarbons such as heavy fuel and crude oils, and more especially oils of a very heavy asphaltic nature.

The principal reactions which may be involved to a greater or less extent in the practice of my invention may be summarized as follows:

1. Paraffin hydrocarbons on being brought into contact with ferric oxid at elevated temperatures are oxidized or dehydrogenated, forming unsaturated hydrocarbons.

2. Unsaturated hydrocarbons of high molecular weight break up into unsaturated hydrocarbons of less molecular weight when subjected to elevated temperatures, the extent of decomposition or splitting depending upon the temperature and duration of treatment.

3. Ethylene and other gaseous hydrocarbons, including methane, react with ferric oxid at temperatures of from 500° C. to 550° C. forming ferrous oxid, water and carbon.

4. Carbon reduces ferric oxid to ferrous oxid at temperatures of from 550° C. to 600° C. with production of carbon monoxid.

5. Carbon monoxid reduces ferric oxid to ferrous oxid at temperatures of from 550° C. to 600° C. with formation of carbon dioxid.

6. Water vapor reacts with ferrous oxid at about 600° C. forming ferric oxid and highly reactive or so-called "nascent" hydrogen.

7. Unsaturated hydrocarbons are hydrogenated by nascent hydrogen.

This last reaction takes place readily, the nascent hydrogen being even more active than gaseous hydrogen in the presence of a nickel catalyzer.

My invention comprises bringing vapors of heavy hydrocarbon oils mixed with steam into contact with ferrous oxid at elevated temperatures.

In the accompanying drawings, Fig. 1 is a diagrammatic view of a furnace; and Fig. 2 is a chart.

I so adjust the proportion between the hydrocarbon vapor and the steam as to avoid material oxidation of the ferrous oxid to ferric oxid on the one hand, or material reduction to metallic iron on the other.

In one embodiment of my invention I have employed a tube 4" in diameter and 20' long loosely packed with ferrous oxid so that gas may readily pass through the tube and come into intimate contact with the ferrous oxid. The tube is connected with a source of oil vapor such as an oil still of ordinary construction and with any suitable source of steam under pressure. The steam and oil vapor must be supplied to the tube in accurately regulated quantities. For this purpose the tube is provided at its inlet end with an orifice valve (a gate valve with an orifice drilled through the valve) having a $\frac{1}{8}''$ orifice for oil vapor and a $\frac{1}{16}''$ orifice for steam. With orifices of this size and oil vapor and steam each at 10 pounds pressure and substantially no back pressure in the tube, oil and steam will flow into the tube in the ratio of substantially 15 parts by weight of steam to 100 parts by weight of oil and at the rate of substantially 5 pounds of steam and 5 gallons of oil per hour.

The tube may be heated in any suitable way, for instance, by means of electrically heated resistance wire wound around the tube. The heating is preferably so regulated as to maintain a graduated temperature gradient increasing from the inlet toward the outlet end of the tube, but this is not essential to successful operation. At the beginnig of a run, using kerosene boiling at about 240° C., the oil vapor and steam are supplied to the orifice valves at ten pounds pressure, that is, in the ratio of 15 parts by weight of steam to 100 parts by weight of oil and for the production of a light spirit suitable for fuel for internal combustion engines the tube is heated to 500° C. at the inlet end increasing to 620° C. at the outlet end. If a larger proportion of very light boiling point product is desired the temperature of the tube is maintained at 600° C. at the inlet end increasing to 700° C. at the outlet end, but very good extraction from the gas must then be provided, such as by washing or compression.

I do not claim herein any specific form of apparatus for subjecting the hydrocarbon vapors in admixture with steam to the action of ferrous oxid. A type of furnace suitable for the purpose is however illustrated diagrammatically in Fig. 1, wherein 1 indicates the furnace chamber carrying a battery of parallel horizontal reaction tubes 2—2. Each tube is provided at its inlet end with valve connections 3 and 4 for the introduction respectively of steam and hydrocarbon vapors, from the respective headers 5 and 6. 7 represents the outlet header for the reaction products, leading to an appropriate condensing and recovery system.

The products leaving the outlet end of the tube are passed through a condenser in which the heavier products are condensed and separated. The uncondensed vapors and gas are bubbled through the condensate and then through wash oil. The washed gas finally passes through a meter to a gasometer. When the process is carried on with the tube heated to a temperature of 600° C. at the inlet end and 700° C. at the outlet end it is necessary to employ extra good washing and usually also compression to extract the very light spirits from the gas. The use of temperatures from 500° C. at the inlet end of the tube to 620° C. at the outlet end is preferable for the production of ordinary gasoline spirits.

The proportion of steam to oil passed through the tube must be carefully regulated. If too much steam is supplied the ferrous oxid will be oxidized to ferric oxid which will accumulate and the conversion of the heavier unsaturated hydrocarbons to lighter saturated hydrocarbons will soon cease. It is also essential to avoid the reduction of the ferrous oxid to metallic iron because if this occurs carbon will deposit in the tube and ultimately stop the passage of gas therethrough. Under most advantageous operating conditions as described herein the contents of the tube remain at all times essentially in the ferrous state, being substantially free through the normal working length of the tube from ferric oxid, metallic iron, or deposited carbon. I have found that in treating ordinary kerosene the ratio of 15 parts of steam to 100 parts of oil gives satisfactory results at the beginning of the run. The amount of steam employed can be increased as the boiling point of the oil to be treated increases until for an oil boiling at 340° C. the amount of steam can be as high as twenty per cent of the oil. The amount of steam supplied can be readily increased from 15% to 20% of the weight of the oil by increasing the pressure on the steam orifice from 10 pounds to 15 pounds to the square inch. When the process is operating properly no water will be found in the gaseous products at the exit end of the tube and the ferrous oxid in the tube will be free from ferric oxid, metallic iron and carbon. The process when properly regulated is therefore continuous.

The condensate and wash oil produced are distilled and the motor spirits so obtained are nearly water white. By ordinary refining with 1% of sulfuric acid and washing a perfectly water white product of pleasant aromatic odor and containing only about 10 to 20% of unsaturated compounds is obtained. The composition of the product varies a little with the temperatures used but it appears to be essentially composed of paraffins, or cyclo-paraffins, and the unsaturated compounds are believed to consist principally of cyclo-olefins.

I have observed in specific instances that the motor spirit produced in the manner described above yields upon fractionation a series of frictions which seem to be substantially identical (for corresponding temperature intervals) both in specific gravity and in refractive index, irrespective of the nature of the oil processed or of the precise temperature within the tube, provided of course this temperature is sufficiently high to ensure decomposition of the steam. On the other hand the percentage of the total product appearing in the several fractions varies according to the temperature in the tube; the higher temperatures tending to larger proportions in the low-boiling fractions, as stated above. This situation is well illustrated in the accompanying drawing in which the Fig. 2 is a chart indicating the specific gravities and refractive indices of corresponding fractions from:

1. A motor spirit prepared in accordance with the present process from a California crude oil having an asphaltic base (curves $S^1$ and $R^1$);
2. A motor spirit prepared in accordance with the present process from a mid-continental crude oil having a paraffin base (curves $S^2$ and $R^2$); and
3. A typical commercial gasoline consisting chiefly of paraffins with a minor proportion of unsaturated bodies (curves $S^3$ and $R^3$).

In each case the curve marked S represents the specific gravity in terms of the Baumé scale for liquids lighter than water and the curve marked R the refractive index The extremely close correspondence in the physical properties, specific gravity and refractive index, of the fractions produced by the present process, irrespective of the nature of the original raw material, will be observed: also that in respect to these properties the material differs widely from the type of commercial gasoline represented by the curves S³ and R³.

When the residue from the distillation of the condensate reaches a boiling point of 200° C. it is returned to the still and re-run unless a kerosene product is desired. With heavy crude oils having an asphaltic base I generally run the still down to coke, and the average yield of motor spirit is about 80%.

The reactions in the tube are undoubtedly very complicated, involving a combination of several instantaneous or simultaneous reactions. Among such reactions the following may perhaps occur, although no limitation of my invention is to be inferred therefrom:

The steam reacts with ferrous oxid forming ferric oxid and hydrogen, the latter in highly reactive or nascent form: the ferric oxid is at once re-reduced to ferrous oxid with coincident formation of hydrocarbons of a lower degree of saturation and probably of simpler constitution and lower boiling point. These unsaturated hydrocarbons react under the operating conditions with the hydrogen derived from the steam, the product being light hydrocarbons, mostly of the saturated type, as above set forth. The oxygen from the steam ultimately appears largely as carbon monoxid and carbon dioxid formed by the oxidation of the carbon. The hydrogen equivalent of this deposited carbon appears largely or entirely in the exit gases.

With a maximum temperature of about 620° C. indicated by a thermocouple at the center of the 4″ tube as disclosed I have found that about two-thirds of the ethylene is decomposed, the balance passing into the gaseous products. The composition of the fixed gas is about 50% to 70% of hydrogen, about 20% ethylene and about 10% carbon monoxid, the yield of gas being about 30 cubic feet per gallon of liquid hydrocarbon treated. The quantity and composition of the fixed gases will vary somewhat according to the temperature, the velocity of the feed, the proportion of steam used, and other conditions of the process.

In practice I have found that the best apparatus for conducting the process is a unit furnace of the muffle type having 20 tubes, each 8″ in diameter and 20′ long, the tubes operating in parallel. A furnace of this size will produce about 250 barrels of motor fuel in 24 hours continuous operation.

Any of the standard methods of gas washing may be used and the wash oil and condensate distilled by the sensible heat of the gases issuing from the furnace.

In starting my process the reaction tube may be filled with ferric oxid and this reduced to ferrous oxid by heating and passing a reducing gas through the tube. Hydrocarbon and steam are then supplied to the tube and the process proceeds as described.

The product produced by the process above described, is claimed in application filed by me on October 27, 1921, Serial No. 510,891.

I claim:—

1. Process of preparing lower boiling hydrocarbons from higher boiling hydrocarbons comprising subjecting the latter in vapor form and admixed with steam to the action of an iron compound substantially maintained in the state of ferrous oxid at an elevated temperature not substantially below 550° C.

2. Process of preparing lower boiling hydrocarbons from higher boiling hydrocarbons comprising subjecting the latter in vapor form and admixed with steam to the action of ferrous oxid at an elevated temperature not substantially below 550° C., and regulating the proportion of steam to hydrocarbon to maintain the oxid substantially in the ferrous state.

In testimony whereof, I affix my signature.

ALEXANDER S. RAMAGE.